United States Patent
Dugan

(10) Patent No.: US 7,488,121 B2
(45) Date of Patent: Feb. 10, 2009

(54) OPTICAL TRANSCEIVER MODULE

(75) Inventor: Richard W. Dugan, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 80 days.

(21) Appl. No.: 11/565,713

(22) Filed: Dec. 1, 2006

(65) Prior Publication Data

US 2008/0131135 A1    Jun. 5, 2008

(51) Int. Cl.
*G02B 6/36* (2006.01)
(52) U.S. Cl. .......................... 385/92; 439/577
(58) Field of Classification Search ................ 439/577, 439/638; 385/53, 92
See application file for complete search history.

(56) References Cited

U.S. PATENT DOCUMENTS 5,104,243 A * 4/1992 Harding ........................ 385/84
5,325,455 A * 6/1994 Henson et al. ................ 385/89

OTHER PUBLICATIONS

X2 MSA 10 Gigabit—A Cooperation Agreement For A Small Versatile 10 Gigabit Transceiver Package; Issue 0.9, Jul. 31, 2002, X2 MSA Rev 0.9; pp. 1-23.
Xenpak 10 Gigabit Ethernet MSA—A Cooperation Agreement For 10 Gigabit Ethernet Transceiver Package; Issue 3.0, Sep. 18, 2002, Xenpak MSA Rev 3.0, pp. 1-77.
Ali Ghiasi, Broadcom Corporation; Robert Snively, Brocade Communication Systems, Inc.; XFP—10 Gigabit Small Form Factor Pluggable Module; XFP Revision 4.5, Aug. 31, 2005; Copyright 2002-2005 by XFP Promoters; pp. i-viii and 1-168.

* cited by examiner

*Primary Examiner*—Khiem Nguyen

(57) ABSTRACT

Optical transceiver with pluggable optical module. An electro-optical transceiver, preferably in a standard form factor such as XENPAK, XPAK, or X2, is adapted to receive a pluggable optical module, preferably complying with the XFP standard. The transceiver adapts signals from the pluggable optical module to the transceiver interface.

9 Claims, 1 Drawing Sheet

OPTICAL TRANSCEIVER MODULE

TECHNICAL FIELD

Embodiments in accordance with the present invention relate to optical to electrical transceiver modules, such as XENPAK, XPAK, and/or X2 transceiver modules.

BACKGROUND

Transceiver modules, such as optical to electrical transceiver modules, are available in standardized packages and form factors. These standardized modules, in form factors such as XENPAK, XPAK, and/or X2, allow manufacturers of digital networking equipment such as switches, hubs, and routers to provide for field replaceable and upgradeable interfaces between the network device and external data lines. Typical modules of is type are sold by Cisco, Finisar, JDS Uniphase, Avago Technologies, and Intel to name but a few companies.

These modules typically contain not only the transceiver, which comprises an optical receiver—preamplifier and a laser diode transmitter, but also additional circuitry for data encoding and decoding, diagnostics, serial numbers and manufacturer identification, power control, and the like.

Since the electro-optical elements are built into the module, a different module must be designed, tested, and manufactured for each optical solution, such as 850 nm, 1310 nm, 1550 nm wavelengths, different laser power levels, different optical connectors, and so on. For every change or innovation in the optical portion, a complete new module is needed

SUMMARY OF THE INVENTION

A standard form factor transceiver module is adapted to use a standard pluggable optical module. In one embodiment, pluggable optical modules such as XFP or SFP+ modules are adapted to the XENPAK, XPAK, and/or X2 form factor.

DETAILED DESCRIPTION OF THE EMBODIMENT

Figure 1:
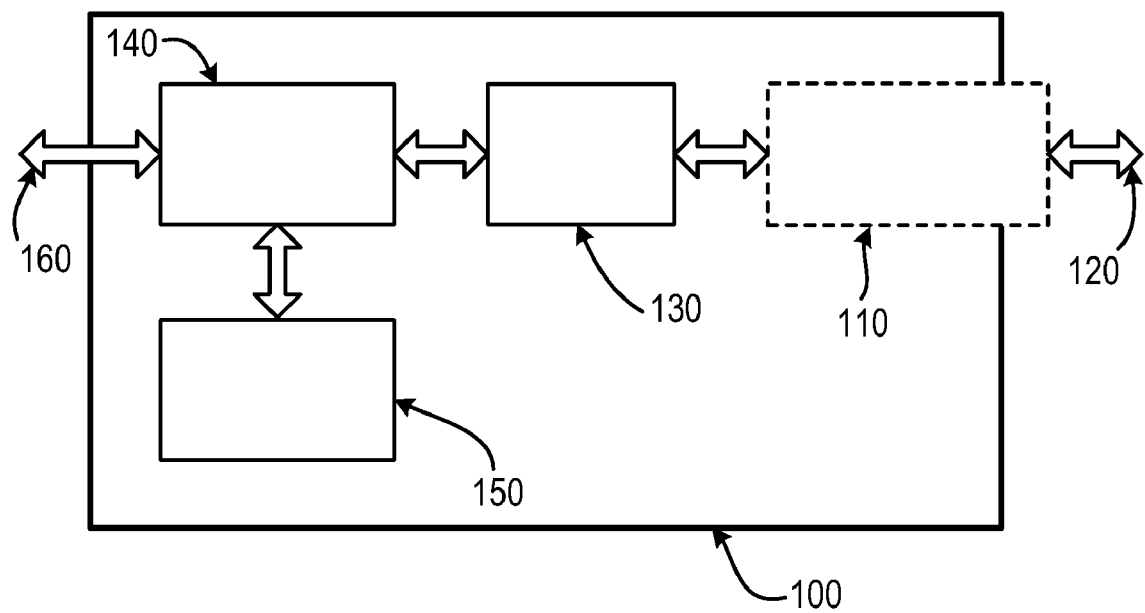
FIG. 1 shows a module according to the present invention.

According to the present invention, and as shown in the embodiment of FIG. 1, transceiver module 100 is adapted to receive pluggable optical transceiver 110. Pluggable optical transceiver 110 accepts optical input 120 and mates with connector 130 which connects pluggable optical transceiver to interface conversion integrated circuit 140. Conversion circuit 140 connects 160 transceiver module 100 to external circuitry, such as that of a network hub, switch, or router. Conversion circuit 140 also connects to expansion circuitry 150.

In one embodiment, pluggable optical transceiver 110 is an XFP module. XFP optical transceiver modules are protocol agnostic supporting protocols such as OC192/STM-64, 10 Gigabit Fibre Channel, G.709, and 10 Gigabit Ethernet. The XFP standard is supported by the XFP Multi Source Agreement (MSA) Group, and managed by the SFF Group of Saratoga, Calif. The current version of the XFP standard is XFP Version 4.5, incorporated herein by reference. XFP pluggable optical transceivers are sold by companies such as Cisco Corporation, Brocade Communications Systems, Inc., Finisar Corporation, JDS Uniphase Corporation, and others. In such an embodiment, module 100, through connector 130, accepts XFP or SFP+ modules.

XFP modules present an interface at connector 130 defined as XFI for high-speed serial transmit (TX) and receive (RX) data, and an XFP low-speed 2 wire interface for accessing status and control registers. These interfaces are defined in the XFP standard.

The SFP+ package provides a similar protocol-agnostic differential serial transmit and receive module in a smaller package than XFP. The SFP+ standard is being developed under the auspices of the American National Standards Institute (ANSI) T11 committee.

Module 100 accepting pluggable optical transceiver 110 in a form such as XFP preferably meets the XENPAK, XPAK, or X2 form factor.

XENPAK is a standardized interface module supporting the IEEE 802.3ae 10 Gigabit Ethernet standard. The XENPAK standard is supported b the XENPAK MSA Group. The XENPAK interface is defined in XENPAK MSA Rev 3.0 issued 18 Sep. 2002.

XPAK and X2 are other commonly used transceiver form factors. XPAK is a smaller form factor than XENPAK, using the same electrical interface defined by 802.3ae, called XAUI, as well as an additional multi-phase high-speed interface known as SFI-4 phase-2. X2 is also a smaller form factor than XENPAK, and shares the XENPAK XAUI electrical interface.

According to the present invention, interface conversion integrated circuit 140 converts from the XFI interface at connector 130 to XAUI interface 160. Conversion integrated circuit 140 also supports expansion circuitry 150. Interface conversion circuit maybe a FPGA, or an ASIC. Among other functions, interface conversion integrated circuit 140 performs serialization-deserialization and encoding-decoding to match XAUI signal lines 160 to XFP serial interface at connector 130. Designs and integrated circuits performing these functions are available from companies such as Aeluros, Fujitsu, Verilog, Texas Instruments, Vitesse Semiconductor, and AMCC. These conversion functions may be performed by one integrated circuit as shown as 140, or by a plurality of integrated circuits.

While the embodiments of the present invention have been illustrated in detail, it should be apparent that modifications and adaptations to these embodiments may occur to one skilled in the art without departing from the scope of the present invention as set forth in the following claims.

The invention claimed is:

1. An optical transceiver module comprising:
   a socket for receiving a pluggable optical module,
   an interface conversion circuit configured to convert signals from a first interface to a second interface, wherein the conversion comprises one or more of: serialization and deserialization, or encoding and decoding, and
   a housing for the socket and interface, the housing adapted to receive the pluggable optical module.

2. The module of claim 1 where the housing and transceiver module comply with the XENPAK specification.

3. The module of claim 1 where the housing and transceiver module comply with the XPAK specification.

4. The module of claim 1 where the housing and transceiver module comply with the X2 specification.

5. The module of claim 1 where the socket for the pluggable module complies with the XFP specification.

6. The module of claim 1 where the socket for the pluggable module complies with the SFP+specification.

7. The module of claim 1 where the interface conversion circuit is a single integrated circuit.

8. The module of claim 1 where the interface conversion circuit is a plurality of integrated circuits.

9. The module of claim 1, wherein interface conversion circuit is connected to an XFI interface at the socket and to an XAUI interface.

* * * * *